Figure 1:
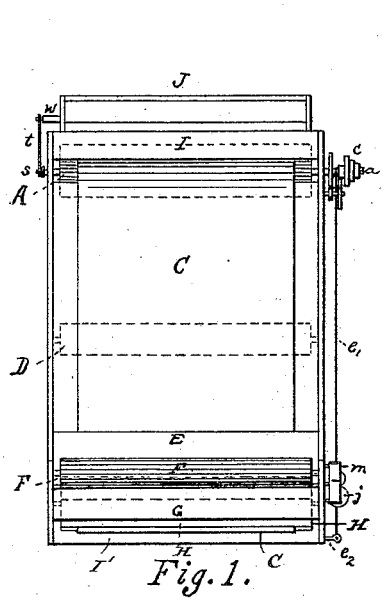

(No Model.)

C. C. WEBBER.
CLOTH MEASURING AND INSPECTING MACHINE.

No. 310,757. Patented Jan. 13, 1885.

Witnesses
A. G. Hofman
J. S. Webber

Inventor
Charles C. Webber

UNITED STATES PATENT OFFICE.

CHARLES C. WEBBER, OF HOLYOKE, MASSACHUSETTS, ASSIGNOR TO HIMSELF, AND THOMAS CAMPBELL, OF CHICAGO, ILLINOIS.

CLOTH MEASURING AND INSPECTING MACHINE.

SPECIFICATION forming part of Letters Patent No. 310,757, dated January 13, 1885.

Application filed March 26, 1884. (No model.)

*To all whom it may concern:*

Be it known that I, CHARLES C. WEBBER, a citizen of the United States, residing at Holyoke, in the county of Hampden, in the State of Massachusetts, have invented a new and useful Cloth Measuring and Inspecting Machine, of which the following is a specification.

Heretofore cloth-measuring machines have commonly been constructed so as to work either by passing the cloth over a roll or cylinder having a measured circumference, or by rolling a measuring-wheel on the cloth as it is drawn along. In both of these methods the texture, elasticity, nap, and thickness of the cloth, and each of them, influences the operation of the roll or wheel in such a manner as to make the measurement of the cloth unreliable, and frequently incorrect. This objection is so serious and well known that few persons are willing to accept any other measurement than that which is obtained by passing the cloth over a table a number of yards in length and having the yards and parts of a yard marked upon it, or by the direct use of the yard-stick. Again, the mechanism for indicating the number of yards measured has usually consisted of a pointer and a series of numbers so arranged that the whole series are visible at the same time, which arrangement would sometimes lead to a confusion of the eye, and consequent mistakes in recording the number of yards measured.

The first of the above-named objections is overcome in my invention by providing an endless apron stretched so as to present a taut horizontal or substantially horizontal portion on which the cloth is caused to ride, while motion is transmitted therefrom to a counting device or length-indicator, which thus measures the invariable endless apron, and therewith the cloth which rides upon it, regardless of the texture, elasticity, nap, or thickness of the latter. I have discovered that it is essential to correct measurement that the cloth be deposited upon said horizontal or substantially horizontal portion of the apron, and discharged or removed therefrom without such strain as results from conducting the cloth to and from said measuring portion of the apron around or upon the convexities formed by the respective stretching-rolls, or either of them; and I provide mechanical "shields," which keep the cloth out of contact with those portions of the apron embracing the rolls, whether the same be taken from above the table or from the floor. I also operate the counter through the medium of that stretching-roll which is driven by the apron, so as to avoid the discrepency which might otherwise result from independent movement of the driving-roll when the machine is suddenly started. The second of said objections is obviated by my improved counting device, in which a vertical slide bearing consecutive numbers is mounted behind a screen that has a hole or "sight," through which but one number is visible at a time, to indicate yards, said slide being moved one number for every yard measured, while through another sight a rotary cylinder exposes numbers indicating the parts of a yard in eighths, the latter also being thus shown consecutively, only one at a time. In this manner the actual measure only of the cloth is indicated, thus preventing mistakes in reading the index and recording the number of yards and eighths measured. A simple device for returning both indicators to "zero," preparatory to each fresh measurement completes this part of my invention.

Another part of this invention consists in a novel combination and arrangement of parts which provides for "inspecting" cloth in the manner practiced in cloth-mills, which includes penciling, rubbing, and the like to correct the appearance and surface of the cloth, and at the same time provides for delivering the cloth to the measuring part of the machine free from strain.

A sheet of drawings accompanies this specification as part thereof.

Figure 6:
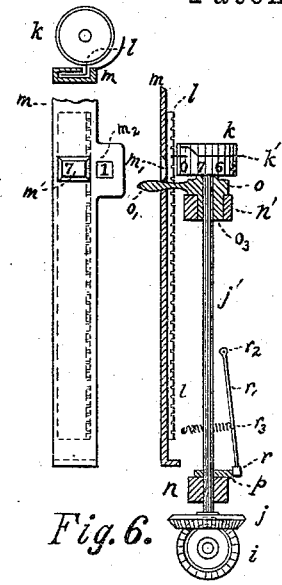
Figure 7:
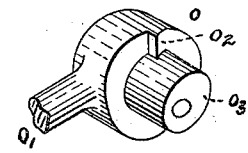
Figure 8:
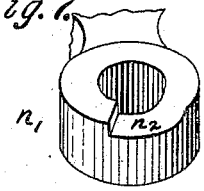
Figure 8:
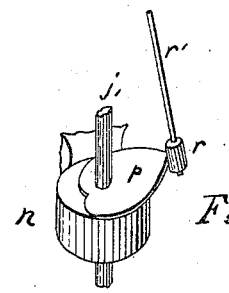
Figure 2:
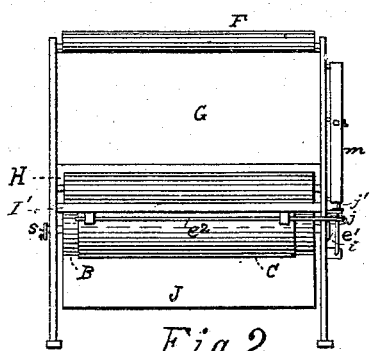
Figure 3:
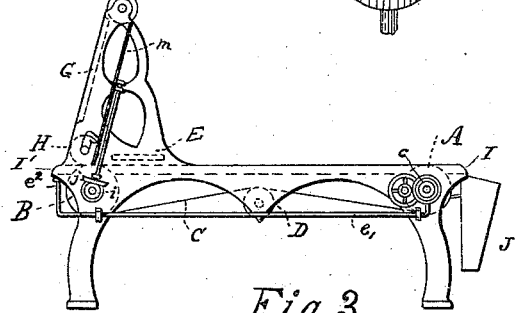
Figure 5:
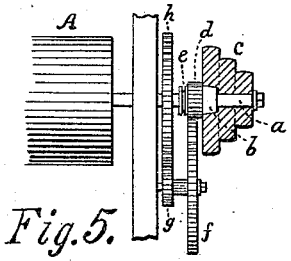
Figure 4:
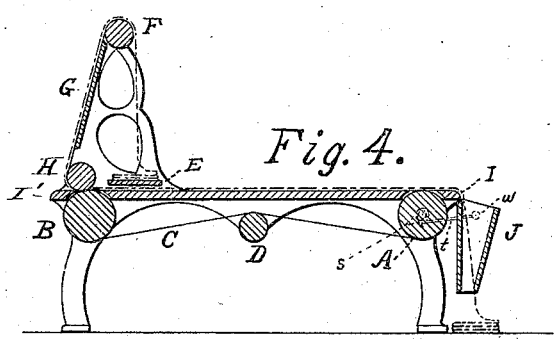

Figure 1 of these drawings is a top or plan view, Fig. 2 is a front view, Fig. 3 is a side view, and Fig. 4 is a vertical longitudinal section, of my machine. Fig. 5 is a top view of the driving-gear, partly in section, on a larger scale. Fig. 6 represents the counting device by a front view and longitudinal and transverse sections on the same scale; and Figs. 7 and 8 are detail views of parts of the same in perspective.

Like letters of reference indicate the same parts in all the views.

At opposite ends of a horizontal, or substantially horizontal table, are mounted two rolls, A and B, and around them and over the top of the table is tightly stretched an endless apron, C. Underneath this apron is a small roll, D, for tightening the apron and keeping it in the middle of the table. To this end said roll D is adjustable horizontally, as well as vertically, in an ordinary way, by means not shown.

E is a shelf which reaches across the table above the apron, and upon which cloth to be inspected and measured is placed. An elevated roll, F, an inclined table, G, and a parallel delivery-roll, H, at the lower edge of the latter, provide for inspecting the cloth as it passes from said shelf E to the measuring part of the machine. Horizontal shields I' and I, Figs. 1 and 4, supported between the side castings of the machine-frame, provide, respectively for conducting the cloth to the horizontal or straight portion of the apron C, above and out of contact with the convexity formed by the roll B, when the cloth is taken from the floor, instead of from said shelf E, and for continuing the motion of the cloth in a straight line beyond the influence of the roll A, thus insuring greater accuracy in measuring, as aforesaid. A folder consisting of a swinging tube or box, J, is hinged to the shield I and driven by a crank-pin, $s$, on the end of the roll A, a connecting-rod, $t$, and a stud, $w$, the latter on the box. The cloth passing through this folder, as shown by the dotted line in Fig. 4, is by its swinging motion laid neatly on the floor.

On one end of the shaft of the roll B is a small bevel-gear, $i$, which, in connection with an intermeshing bevel-gear, $j$, drives the shaft $j'$ of the counting device $m$. (Shown in detail in Figs. 6, 7, and 8.) Said shaft $j'$ has fastened to its upper end a cylinder, $k$, Fig. 6, which rotates once for every yard measured, and has marked upon its periphery numeral figures, from 0 to 7, inclusive, indicating eighths of a yard. It also has a circumferential motion-transmitting flange, $k'$, of the form shown—that is to say, having a short incline or step at a given point, and elsewhere horizontal, instead of being made of the more common spiral form. This flange $k'$ engages in notches cut in the edge of a slide, $l$, and advances the latter a given distance at each rotation of the cylinder $k$. The slide $l$ bears figures representing yards, only one of which can be seen at one time through a hole or sight, $m'$, in the case which incloses the slide, and is moved one notch, bringing to view a fresh figure at each rotation of the cylinder, as aforesaid. This motion of the slide is commenced by said step of said flange $k'$ after 7 on the cylinder $k$ has passed the sight $m^2$, through which the figures on said cylinder $k$ are successively exposed, and is completed at the time 0 on said cylinder $k$ comes in sight, thus showing on the slide $l$ another figure, next higher, indicating the completion and number of the yard last measured.

The shaft $j'$ of the counting device is supported by bearings $n$ and $n'$, connected with the frame of the machine. The upper bearing, $n'$, Figs. 6 and 7, is bored larger than the shaft, and has fitted to it a loose bushing or sleeve, $o$, having a handle, $o'$, and through this sleeve $o$ a hole is bored, one side of the center, to form an eccentric bearing for the shaft $j'$. On the upper side of the bearing $n'$ (shown plainly in perspective in Fig. 7) is formed a recess, $n^2$, one side of which is an inclined plane, and on the sleeve $o$ is a corresponding projection, $o^2$, which fits into said recess $n^2$. On said shaft $j'$ is also secured a heart-shaped cam, $p$, Figs. 6 and 8, on the edge of which, as it revolves, a roller, $r$, travels. This roller is fitted loosely to the end of a swinging rod, $r'$, which is pivoted at its upper end, $r^2$, to the frame of the machine, and the roller is kept firmly against the face of the cam $p$ by a spring, $r^3$, applied to the rod, as seen in Fig. 6.

The machine is driven by a belt applied to a cone-pulley, $c$, Figs. 1, 3, and 5, which is fitted loosely on a protruding end, $a$, of the shaft of the roll A, and connected therewith, as best shown in Fig. 5. On the same shaft there is fitted loosely a small pinion, $d$, having a circumferential groove, $e$, cut in its hub to receive the fork of a shipper, $e'$, Figs. 1, 2, and 3, which, extending along the side of the machine in the form of a rock-shaft, and connected at the end with a sliding rod, $e^2$, enables the operator to start and stop the machine at will from his position before the inspecting-table G. In starting, a clutch-cone, $b$, on the pinion $d$ is pressed into a corresponding conical recess in the pulley $c$, connecting the latter with said pinion $d$, which in turn is connected with said roll A through a train of gears, $f$, $g$, and $h$, the last of which is keyed fast to the shaft of the roll.

The operation of the machine as a whole is as follows: A cut or piece of cloth to be inspected and measured is placed on the shelf E, and the first end of the cloth is passed over the roll F, as indicated by dotted lines in Fig. 4, and under the roll H. Here it comes in contact with the endless apron C, which carries it along till it is separated therefrom by the shield I, and drops through the folder J, by which it is deposited on the floor; or if the cloth is not to be inspected it may be taken from the floor, in which case it passes over the shield I' to the apron C, and thence over the shield I into the folder J. The apron C, which carries the cloth, also turns the roll B, which in turn, by means of the gears $i$ and $j$, turns the shaft $j'$ of the counting device one rotation for each yard that the apron moves. If the first end of the cut of cloth be placed at any particular point on the table, and the slide $l$ and the cylinder $k$ both be set at zero, or so as to indicate 00, when the other end of the cut of cloth has come to the same point, the number on the slide $l$, as seen through the hole $m'$, will show the number of yards in the cut of cloth, and the number seen in the hole $m^2$ will show the number of eighths in the last incomplete yard. As seen in Fig. 6, the counting device indicates seven yards and one-eighth.

When it is desired to measure another piece of cloth, after placing it in position, as before, the handle $o'$, Figs. 6 and 7, is turned partly around to the right. This, by the action of the eccentric $o^3$, carries the cylinder $k$ away from the slide $l$, which is thus released from the flange $k'$ and falls by its own gravity till 0 is again seen in the sight $m'$. Then by moving the handle $o'$ still farther in the same direction the projection $o^2$, Fig. 7, is caused to slide up the incline of the notch $n^2$, thus raising the sleeve $o$, and with it the cylinder $k$ and shaft $j'$, until the gear $j$ is entirely free from contact with the gear $i$, when, by the action of the spring $r^3$, through the rod $r'$ and roller $r$ upon the heart-shaped cam $p$, the cylinder $k$ is made to turn in either direction until 0 is seen in the sight $m^2$. Then by moving the handle $o'$ in the reverse direction to its first position, so as to restore the displaced parts to working condition, the counting device is made ready to commence measuring again.

While the cloth is passing through the machine from the shelf E it can be conveniently inspected on the inclined table G, which provides the requisite smooth and solid backing behind the cloth at every point, and exposes its right side or face in a suitable plane, to facilitate examining the same and penciling it, or otherwise correcting its appearance. At the same time by locating said shelf E close above the apron, so that the weight of cloth on the respective sides of the elevated roll F shall be about equal, the cloth is deposited upon the aforesaid measuring portion of the apron, substantially free from strain, or in a natural condition as regards length.

Having thus described my said cloth measuring and inspecting machine, I claim as my invention, and desire to patent under this specification—

1. In a cloth-measuring machine, an endless apron connected with a counting device, and adapted to carry the cloth lengthwise upon a taut horizontal, or substantially horizontal, portion thereof, substantially as herein specified, for measuring the length of cloth in the manner set forth.

2. In a cloth-measuring machine having an endless cloth-carrying apron connected with its counting device, and a pair of rolls, around which said apron is stretched to render a portion thereof taut in a horizontal plane, horizontal shields above the rolls, to relieve the cloth from roll-effect in passing above the rolls, substantially as herein specified.

3. The combination, in a cloth-measuring machine, of an endless cloth-carrying apron, a roll for driving said apron, and a roll driven by said apron, the latter connected with a counting device, said apron being stretched around said rolls and adapted to carry the cloth on a taut horizontal portion thereof, substantially as herein specified.

4. In a cloth-measuring machine, a counting device comprising a rotary cylinder to indicate eighths individually, and a notched slide operated by a stepped circumferential flange on said cylinder to indicate measured yards individually, in the manner set forth.

5. In a cloth measuring and inspecting machine, the combination, with the within-described rotary count-indicating cylinder $k$ and gravitating count-indicating slide $l$, of an upper bearing for the shaft of said cylinder, having a cam-recess in its upper surface, and an eccentrically-bored bushing-sleeve adapted to rotate and slide within said bearing, and constructed with a projection to coact with said cam-recess, substantially as herein specified, for the purpose set forth.

6. In a cloth-measuring machine, the combination of the within-described slide $l$, cylinder $k$, shaft $j'$, bearing $n'$, sleeve $o$, spring $r^3$, swinging rod $r'$, roller $r$, and heart-shaped cam $p$, substantially as shown and described, for the purposes set forth.

7. In a cloth measuring and inspecting machine, the combination of the within-described shelf E, elevated roll F, inclined inspecting-table G, and delivery-roll H, substantially as shown, for the purposes set forth.

CHARLES C. WEBBER.

Witnesses:
EDWARD W. CHAPIN,
ISAAC TIRRELL.